Patented Sept. 29, 1936

2,055,547

UNITED STATES PATENT OFFICE 2,055,547

TETRAZOIMINO COMPOUNDS

Eugene A. Markush, Jersey City, N. J., assignor to Pharma Chemical Corporation, New York, N. Y., a corporation of New York No Drawing. Application August 8, 1933, Serial No. 684,178

5 Claims. (Cl. 260—46.1)

My invention relates to the production of stabilized tetrazoimino compounds of the general type

in which R is the residue of any diazotizable aromatic amine and

is the residue of a heterocyclic cyclization product containing a solubilizing group, or groups, such as the carboxylic or the sulfonic group.

I have found that compounds of the described character possess excellent stability when subjected to ordinary storage conditions, but which are readily split up into the original diazo body or bodies and the original cyclization product when subjected to an acid treatment.

These new compounds, therefore, are valuable for the production of dyeings, prints or colored effects upon textile fibers or fabrics, or for the production of such dyes, printing compounds or colors in substance apart from the textile fibers or fabrics.

In preparing the dyes, printing compounds or colors in substance apart from textile fibers or fabrics, the tetrazoimino compounds of my invention may be mixed with a coupling compound capable of combining with the original diazo compound, the mixture treated with acid and the combination effected by proper means, or the tetrazoimino compounds may be first treated with acid and the diazo-compounds thereof combined with a coupling compound.

In employing the tetrazoimino compounds of my invention the textile fiber, or fabric may be treated with a mixture of my compounds with a coupling compound capable of combining with the original diazo compounds and the thus treated fiber or fabric subjected to the action of an acid, or the fiber may be first treated with the coupling compound and then with my tetrazoimino compound and subjected to acid treatment, or the fiber, or fabric, may be first treated with my tetrazoimino compound and then with a coupling compound followed by an acid treatment.

I give the following as examples of my invention,

*Example 1*

157 parts 4-chlor-2-amino-anisol are suspended in 400 parts water and 270 parts hydrochloric acid 20° Bé. Ice is added, if necessary, until the suspension is cooled to about 5° C., and the mixture diazotized with 70 grs. sodium nitrite dissolved in 350 parts water. The clear diazonium solution is run slowly into a solution of 200 parts soda ash and 214 parts of the hydrolized cyclization product prepared from alpha-chlor-acetyl-β-amino-cinnamic nitrile and alcoholic potassium hydroxide (Ber. Chem. Gesell., 56, pp. 591–597).

The tetrazoimino compound separates out readily and may be completely precipitated by the addition of salt. It is then filtered, pressed and dried. The tetrazoimino compound, thus formed, is a brownish yellow crystalline body, fairly soluble in water, and when treated with acid is decomposed into diazo 4-chlor-anisidine and the free acid of the cyclization body. Its probable formula is:—

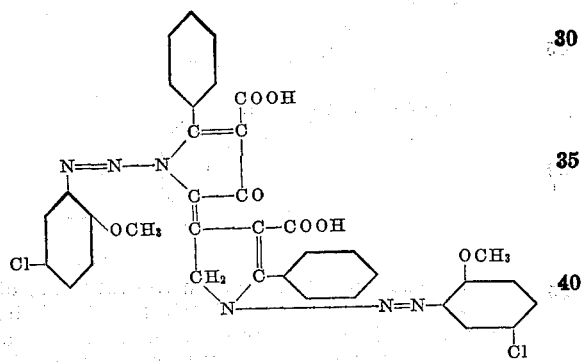

*Example 2*

114 parts of the catalytic reduction product of the double gamma amino acid cyclization body (Ber. Chem. Gesell. 35, 4124)

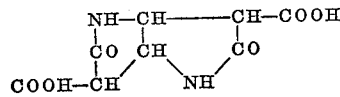

$\xrightarrow{\text{catalytic reduction}}$

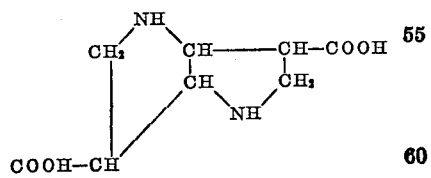

and 200 parts sodium carbonate are dissolved in water and cooled to about 8° C. To this solution is added the diazo solution prepared from 185 parts o-amino-diphenyl-ether dissolved in 1000 parts water and 270 parts hydrochloric acid 20 Bé., and treated with 70 parts sodium nitrite in 350 parts water.

The tetrazoimino body is isolated as in Example 1. Its di-sodium salt is yellow crystalline powder, soluble in water and also upon treatment with acids regenerates the original components.

Its probable formula is:

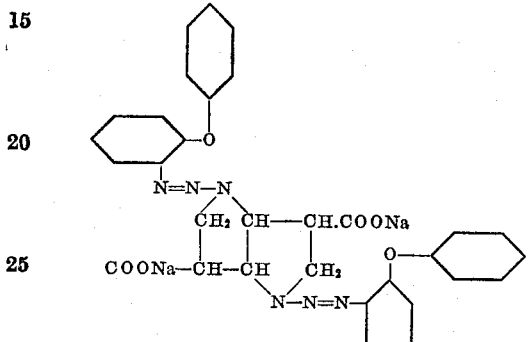

*Example 3*

By replacing the diazonium solution of 185 parts o-amino-diphenyl ether with a molecular equivalent of o-amino-phenyl-benzyl-ether and proceeding as described in Example 2, a tetrazoimino compound is obtained whose probable formula is:—

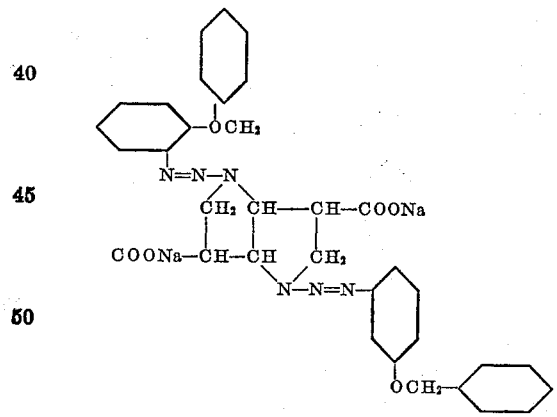

Among the amines suitable in the following of my invention are the diazotizable amines of the benzene, naphthalene and anthracene series, their esters, ethers and substituted compounds.

I do not limit myself to the particular compounds, quantities or steps of procedure mentioned as these are given simply as a means for clearly describing my invention.

What I claim is:—

1. A tetrazoimino compound having the general formula

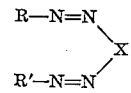

in which R and R' represent the same or different diazotized aromatic amine residues, X represents a dicyclic radical each ring of which consists of 4 carbon atoms and one imino nitrogen atom containing at least one solubilizing member of the group consisting of carboxylic and sulfonic groups the diazo groups being attached to the nuclear nitrogens of the dicyclic radical which compound is split into its original diazotized compound or compounds, and the free heterocyclic diimine upon acid treatment.

2. A tetrazoimino compound producible by combining two molecular proportions of a diazotized aromatic amine with one molecular proportion of a heterocyclic diimine containing at least one solubilizing member of the group consisting of carboxylic and sulfonic groups the diazo groups being attached to the nuclear nitrogens of the dicyclic radical, which compound is split up into its original diazotized compound and the free acid of the heterocyclic diimine compound upon acid treatment.

3. The tetrazoimino compound producible by combining two molecular proportions of diazotized 4-chlor-2-amino-anisol with one molecular proportion of a heterocyclic diimine in which each ring consists of 4 carbon atoms and one imino nitrogen atom containing at least one solubilizing member of the group consisting of carboxylic and sulfonic groups the diazo groups being attached to the nuclear nitrogens of the dicyclic radical, which compound is split up into 2-diazo-4-chlor-anisidine and the heterocyclic diimine upon acid treatment.

4. The tetrazoimino compound producible by combining two molecular proportions of a diazotized aromatic amine with one molecular proportion of the heterocyclic diimine producible from alpha - chlor-acetyl-beta-amino - cinnamic nitrile with alcoholic potassium hydroxide which compound is split up into the original diazotized aromatic amine and the heterocyclic diimine upon acid treatment.

5. The tetrazoimino compound producible by combining two molecular proportions of diazotized 4-chlor-2-amino-anisol with one molecular proportion of the heterocyclic diimine producible from alpha-chlor-acetyl-beta-amino cinnamic nitrile with alcoholic potassium hydroxide which compound is split up into 2-diazo-4-chlor-anisidine and the heterocyclic diimine upon acid treatment.

EUGENE A. MARKUSH.